(12) United States Patent
Nagao et al.

(10) Patent No.: US 10,902,639 B2
(45) Date of Patent: Jan. 26, 2021

(54) INFORMATION PROCESSING APPARATUS, INFORMATION PROCESSING METHOD, AND PROGRAM

(71) Applicant: CANON KABUSHIKI KAISHA, Tokyo (JP)

(72) Inventors: Yoshitaka Nagao, Tokyo (JP); Kanako Takeda, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 54 days.

(21) Appl. No.: 15/688,071

(22) Filed: Aug. 28, 2017

(65) Prior Publication Data

US 2018/0061081 A1    Mar. 1, 2018

(30) Foreign Application Priority Data

Aug. 30, 2016   (JP) .................. 2016-168215

(51) Int. Cl.
*G06K 9/00* (2006.01)
*G06T 7/77* (2017.01)
*G06M 3/08* (2006.01)
*G06Q 10/10* (2012.01)

(52) U.S. Cl.
CPC ............ *G06T 7/77* (2017.01); *G06K 9/00778* (2013.01); *G06M 3/08* (2013.01); *G06Q 10/1091* (2013.01)

(58) Field of Classification Search
CPC ........... G06K 9/00778; G06K 9/00771; G06K 9/00369; G06K 9/00671; G06K 2009/00738; G06K 9/00624; G07C 2011/04; G07C 9/00; G06T 2207/30196; G06T 7/292; G06T 7/70; G06T 2207/30232; G06T 2207/30242; G06T 7/77
See application file for complete search history.

(56) References Cited

U.S. PATENT DOCUMENTS

| 2004/0091134 | A1* | 5/2004 | Long ................. G08G 1/005 382/104 |
| 2006/0269103 | A1* | 11/2006 | Brown ............... G06K 9/00778 382/103 |
| 2009/0034846 | A1* | 2/2009 | Senior ................ G06K 9/00778 382/190 |
| 2010/0177963 | A1 | 7/2010 | Yokomitsu |
| 2011/0231419 | A1* | 9/2011 | Papke .................. G06F 16/784 707/756 |

(Continued)

FOREIGN PATENT DOCUMENTS

| JP | 9-147187 A | 6/1997 |
| JP | 2005-216217 A | 8/2005 |

(Continued)

*Primary Examiner* — Kenny A Cese
(74) *Attorney, Agent, or Firm* — Canon U.S.A., Inc. IP Division

(57) ABSTRACT

An information processing apparatus that estimates waiting time in a waiting line with improved accuracy includes a first acquisition unit that acquires a number of objects in the waiting line, a second acquisition unit that acquires frequency of an object exiting the waiting line, and an estimation unit that estimates waiting time in the waiting line based on the acquired number of objects in the waiting line and the acquired frequency of an object exiting the waiting line.

24 Claims, 13 Drawing Sheets

(56) References Cited

U.S. PATENT DOCUMENTS

| | | | | |
|---|---|---|---|---|
| 2015/0142481 A1* | 5/2015 | McManus | ............... | G06Q 10/02 |
| | | | | 705/5 |
| 2015/0220935 A1* | 8/2015 | Iwai | ......................... | G07G 1/01 |
| | | | | 705/304 |
| 2015/0324647 A1* | 11/2015 | Wuethrich | ......... | G06K 9/00771 |
| | | | | 382/103 |
| 2016/0171566 A1* | 6/2016 | Pugh | ................... | G06O 30/0281 |
| | | | | 705/346 |
| 2016/0191865 A1* | 6/2016 | Beiser | ................ | G06K 9/00778 |
| | | | | 348/156 |

FOREIGN PATENT DOCUMENTS

| | | |
|---|---|---|
| JP | 2007-317052 A | 12/2007 |
| JP | 2010-176225 A | 8/2010 |
| JP | 2011-96140 A | 5/2011 |
| JP | 5932850 B2 | 6/2016 |

* cited by examiner

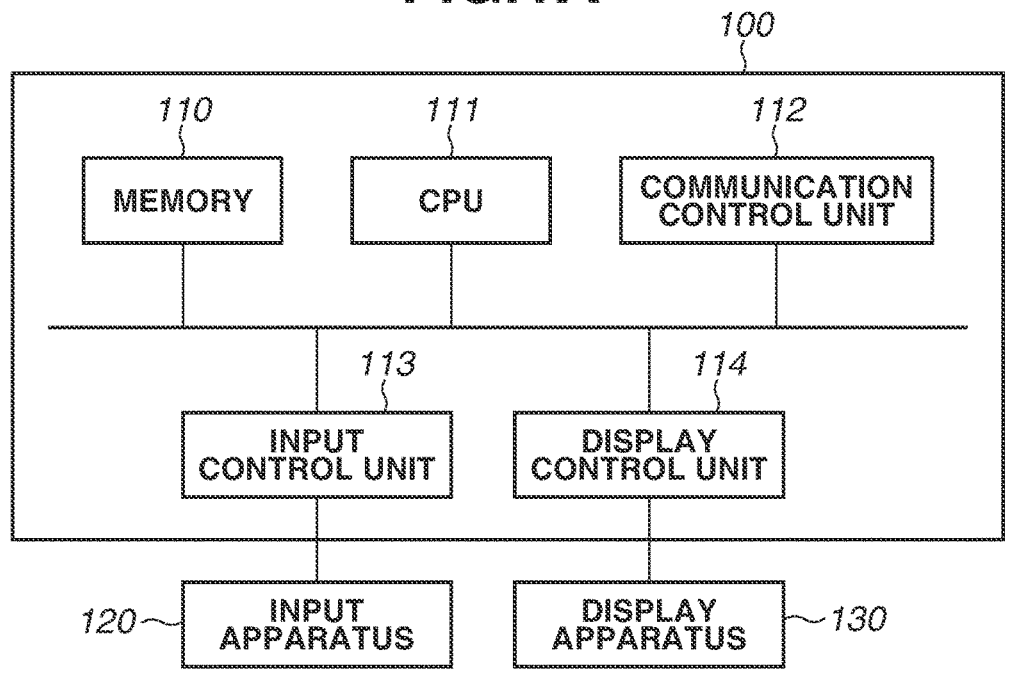
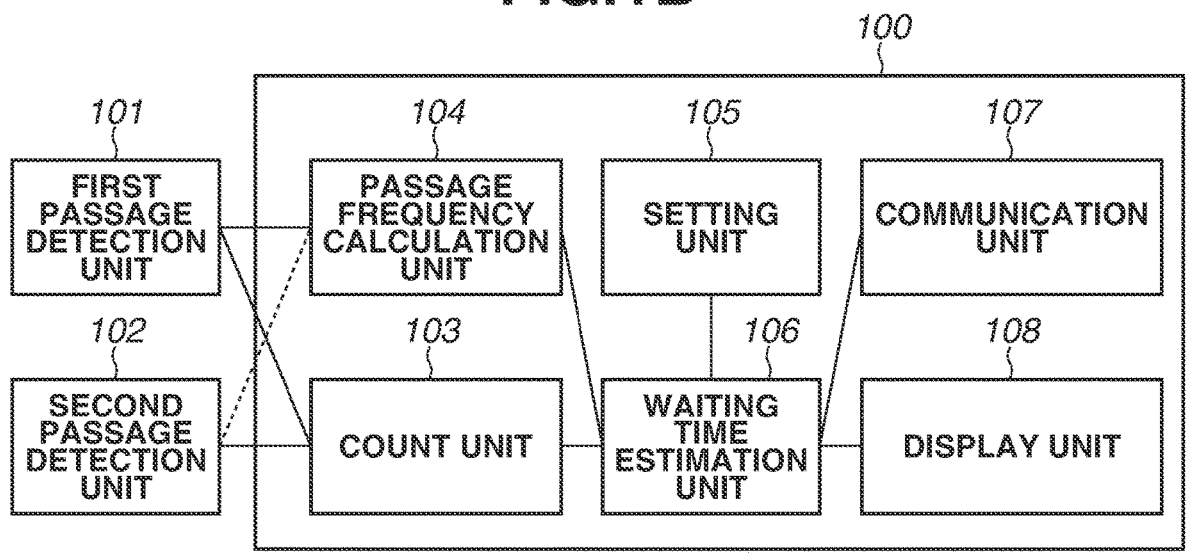

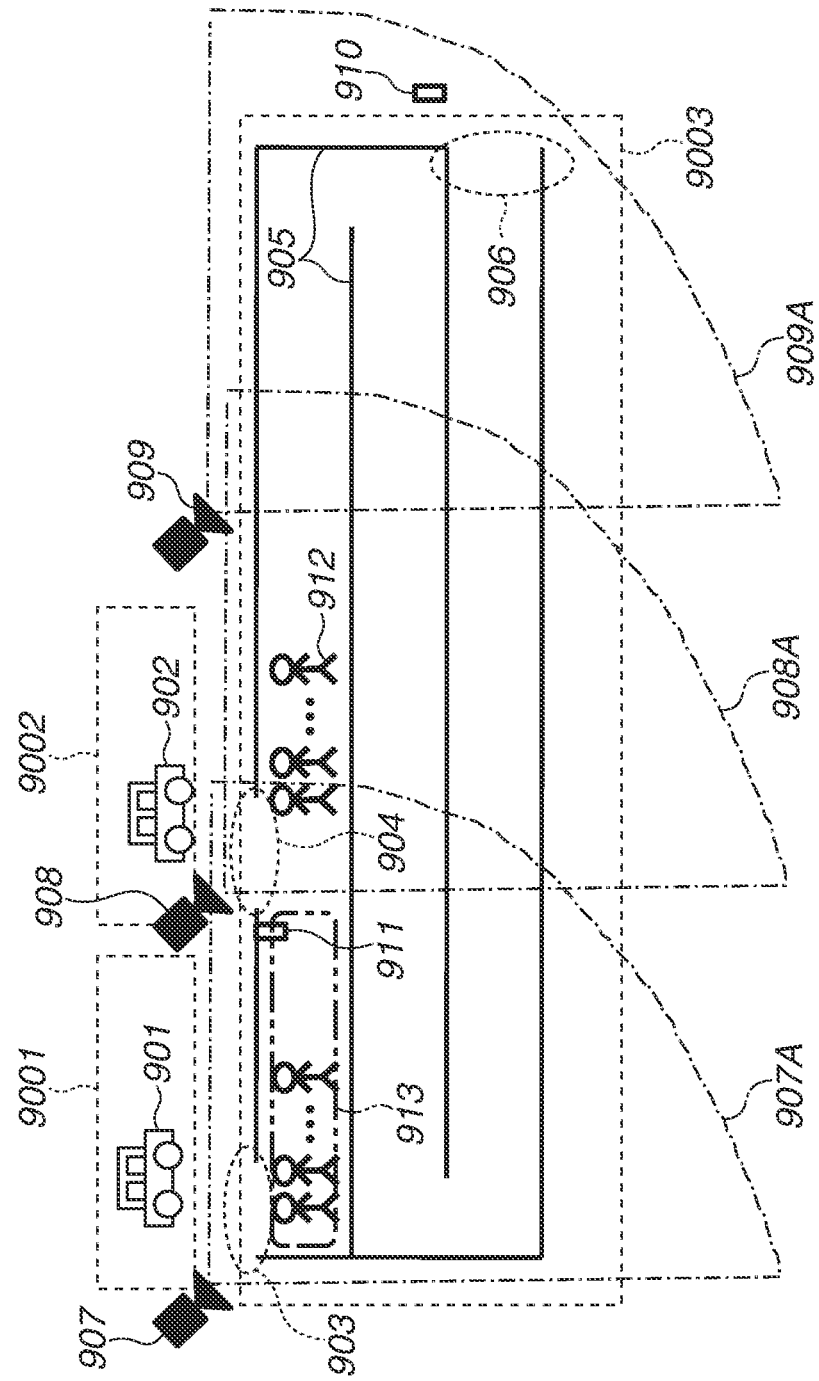

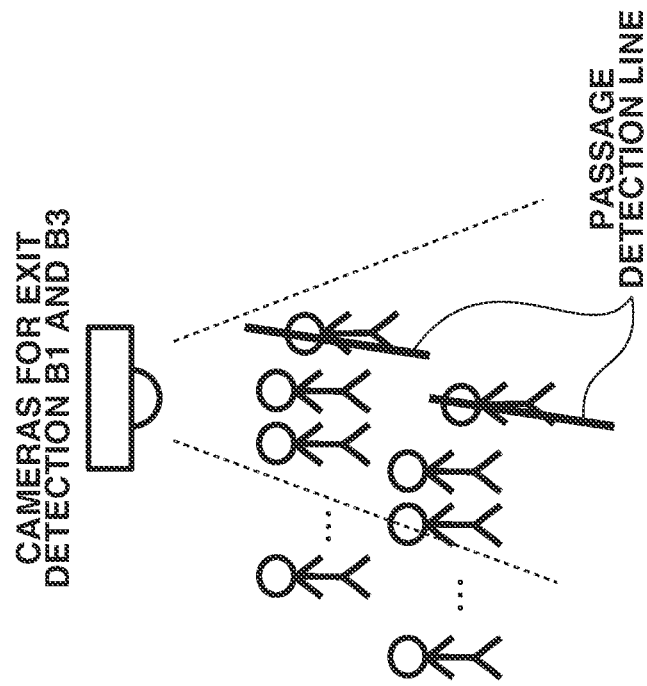
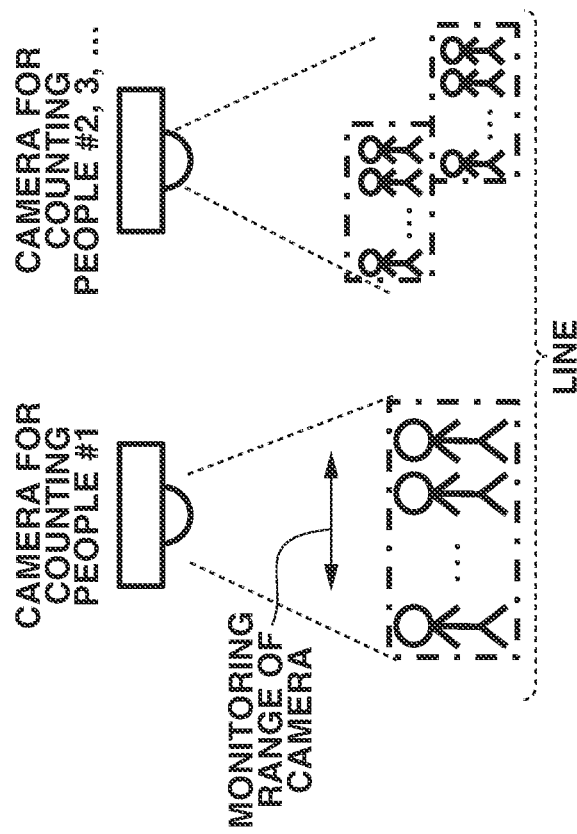

INFORMATION PROCESSING APPARATUS, INFORMATION PROCESSING METHOD, AND PROGRAM

BACKGROUND

Field

The present disclosure relates to an information processing apparatus, an information processing method, and a program.

Description of the Related Art

There is a system that calculates waiting time from average time taken for service and the number of waiting people. There is also a system that estimates the waiting time from the length of a line and the moving time of a person in the line.

For example, Japanese Patent Application Laid-Open No. 9-147187 discusses a system for informing waiting time with respect to an area at an automatic teller machine (ATM) of a bank. The system calculates the waiting time of each customer in a waiting line by multiplying a preregistered average transaction time by the number of customers registered in the waiting line.

Japanese Patent Application Laid-Open No. 2007-317052 discusses a system that generates information associated with a waiting line by processing a video image captured by a monitoring camera and calculates waiting time based on total length of the line.

Japanese Patent No. 5932850 discusses a system that acquires image data obtained by photographing a line including a plurality of moving bodies and calculates waiting time in the line from the length of the line and a moving distance of one of the moving bodies.

SUMMARY

According to an aspect of the present disclosure, an information processing apparatus includes a first acquisition unit configured to acquire the number of objects in a waiting line, a second acquisition unit configured to acquire frequency of an object exiting the waiting line, and an estimation unit configured to estimate waiting time in the waiting line based on the number of objects in the waiting line acquired by the first acquisition unit and the frequency of an object exiting the waiting line acquired by the second acquisition unit.

Further features will become apparent from the following description of exemplary embodiments with reference to the attached drawings.

BRIEF DESCRIPTION OF THE DRAWINGS

FIGS. 1A and 1B illustrate a hardware configuration of an information processing apparatus as an example.

FIG. 9 illustrates application of a waiting time estimation system as an example.

FIGS. 13A and 13B illustrate processing of the waiting time estimation system as an example.

DESCRIPTION OF THE EMBODIMENTS

Figure 2:
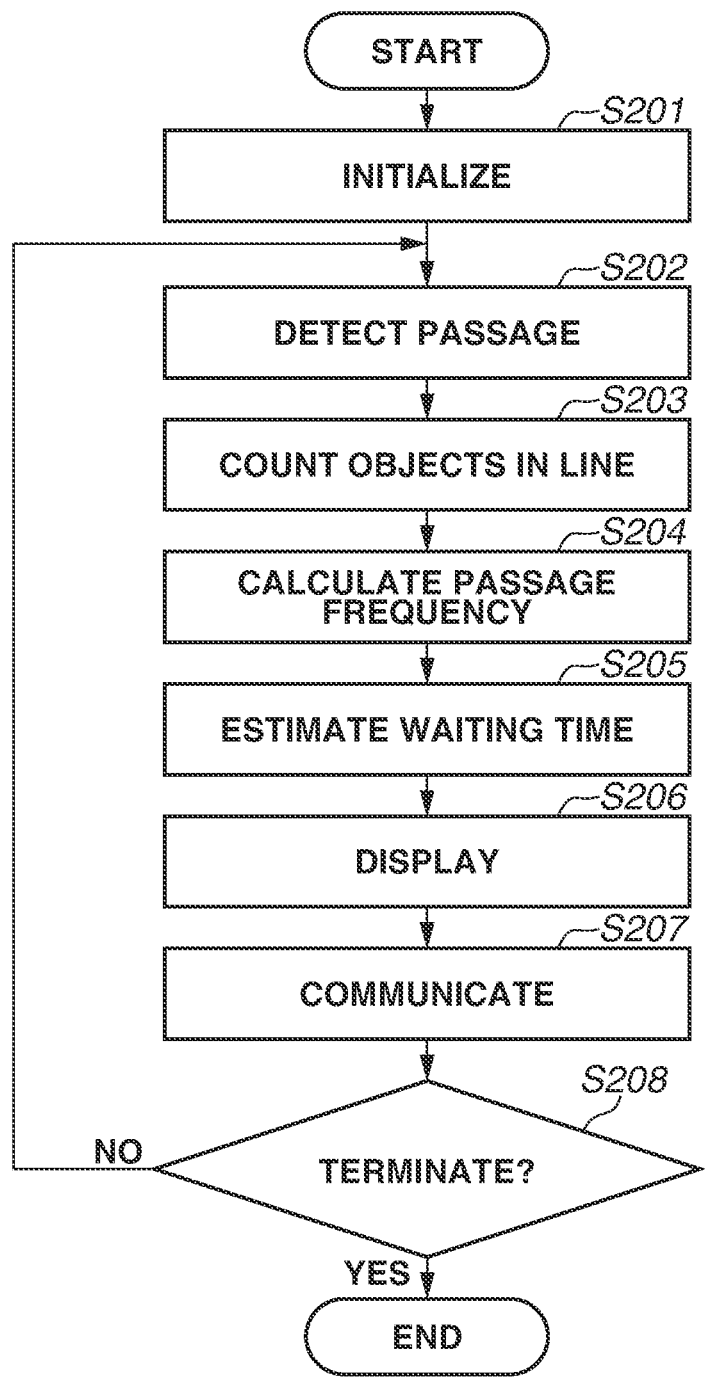
FIG. 2 is a flowchart illustrating processing of the information processing apparatus as an example.

Hereinafter, exemplary embodiments will be described with reference to the drawings.

A first exemplary embodiment will be described below. In the present exemplary embodiment, processing in which a waiting time estimation system acquires waiting time of a waiting line will be described. In the present exemplary embodiment, objects in the waiting line are human bodies, but can be animals, such as livestock, industrial products or intermediate products carried on a lane of a factory, or cargo or containers carried on a conveying lane.

The waiting time estimation system includes an information processing apparatus 100. The information processing apparatus 100 is an apparatus that acquires the number of objects in the waiting line, and frequency at which an object passes through an exit of the waiting line (frequency of an object exiting the waiting line). The information processing apparatus 100 then acquires an estimated value of waiting time of the waiting line based on the acquired number of objects and the acquired frequency. The information processing apparatus 100 includes, for example, a personal computer (PC), a server apparatus, or a tablet apparatus.

FIG. 1A illustrates a hardware configuration of the information processing apparatus 100 as an example according to the present exemplary embodiment.

The information processing apparatus 100 includes a memory 110, a central processing unit (CPU) 111, a communication control unit 112, an input control unit 113, and a display control unit 114.

The memory 110 is a storage device that stores various programs, various setting data, various threshold data, and image data obtained by photographing a waiting line. The CPU 111 is a central processing unit that controls processing of the information processing apparatus 100. The communication control unit 112 is a unit used for communication with an external device through a network. The input control unit 113 is a unit that controls input of information to the information processing apparatus 100 through an input apparatus 120. The display control unit 114 is a unit that controls display of a screen on a display apparatus 130. In the present exemplary embodiment, the information processing apparatus 100 and the display apparatus 130 are independent apparatuses, but the display apparatus 130 can be included in the information processing apparatus 100. The waiting time estimation system can include a plurality of display apparatuses as the display apparatus 130.

The CPU 111 performs relevant processing based on a program stored in the memory 110 or the like. The CPU 111 realizes functions of the information processing apparatus 100 described below with reference to FIG. 1B and the processing of the flowcharts described below with reference to FIG. 2.

FIG. 1B illustrates a functional configuration of the information processing apparatus 100 as an example according to the present exemplary embodiment.

The information processing apparatus 100 includes a count unit 103, a passage frequency calculation unit 104, a setting unit 105, a waiting time estimation unit 106, a communication unit 107, and a display unit 108.

A first passage detection unit 101 and a second passage detection unit 102 detect passage of an object included in the waiting line. The first passage detection unit 101 and the second passage detection unit 102 can be, for example, a passage sensor using infrared radiation, a camera with an image analysis function for detecting passage of an object based on captured images, or the like. The first passage detection unit 101 is provided at an exit of the waiting line and detects an object exiting the waiting line. The second passage detection unit 102 is provided at an entrance of the waiting line and detects an object entering the waiting line.

A partial waiting line cut out from a waiting line can also be considered as one waiting line. For example, the waiting time estimation system can regard a partial waiting line from the center position of one waiting line to the exit as one waiting line, and acquire waiting time from the central position to the exit.

In the present exemplary embodiment, the first passage detection unit 101 and the second passage detection unit 102 detect an object entering the waiting line and an object exiting the waiting line, and transmit information indicating that an object has been detected to the count unit 103 and the passage frequency calculation unit 104. The waiting time estimation system can include an imaging apparatus, such as a camera, for photographing the entrance and the exit of the waiting line without including the first passage detection unit 101 or the second passage detection unit 102. In this case, the CPU 111 detects an object entering the waiting line and an object exiting the waiting line based on images of the entrance and the exit of the waiting line captured by the imaging apparatus. In addition, the first passage detection unit 101 and the second passage detection unit 102 can change an object to be detected, for example, based on an instruction from the information processing apparatus 100 based on an operation performed by a user through the input apparatus 120.

The count unit 103 acquires the number of objects existing in the waiting line based on the result of detection of the objects passing through the entrance or the exit of the object waiting line by the first passage detection unit 101 and the second passage detection unit 102.

The passage frequency calculation unit 104 acquires frequency as first passage frequency, of objects passing through the exit of the waiting line within a preset time period, based on at least results of detection of the objects passing through the exit of the waiting line by the first passage detection unit 101. The passage frequency calculation unit 104 can calculate the first passage frequency based on the state of the waiting line or an interval in outputting the waiting time. In addition, the passage frequency calculation unit 104 can acquire frequency as second passage frequency, of the objects passing through the entrance of the waiting line (frequency at which the objects enter the waiting line), based on detection results by the second passage detection unit 102.

The setting unit 105 accepts the number of people waiting at the time when the waiting time estimation system is activated, and specification of timing for estimating or displaying the waiting time, based on an operation of a user through the input apparatus 120. The setting unit 105 determines the information indicated by the accepted specification as setting information that is used for waiting time estimation processing. The setting unit 105 can store the acquired information in the memory 110 or the like. In the case where the setting information is already stored in the memory 110, the setting unit 105 can use the stored setting information without accepting specification from the user. This method eliminates the need for a user to perform an input operation each time the waiting time estimation system is activated, and the waiting time estimation system can improve convenience of users.

The waiting time estimation unit 106 performs waiting time estimation at a time of performing the waiting time estimation indicated by the setting information determined by the setting unit 105 in a following manner. That is, based on the number of objects in the waiting line acquired by the count unit 103 and the first passage frequency acquired by the passage frequency calculation unit 104, the waiting time estimation unit 106 acquires a value estimated to be a waiting time of the waiting line. The waiting time estimation unit 106 then records the acquired information about the waiting time in the memory 110 or the like. Alternatively, the waiting time estimation unit 106 can acquire the waiting time of the waiting line based on the second passage frequency in addition to the first passage frequency. The communication unit 107 transmits the information about the waiting time acquired by the waiting time estimation unit 106 to an external terminal device or the like. The communication unit 107 performs wired or wireless communication with a device, such as a terminal device.

At the time indicated by the setting information determined by the setting unit 105, the display unit 108 displays on the display apparatus 130 information indicating the waiting time acquired by the waiting time estimation unit 106, e.g., for example, a character string or number sequence.

In the present exemplary embodiment, each of the functional components 103 to 108 is a functional component included in the information processing apparatus 100 that is a single device. However, within a system to which a plurality of information processing apparatuses is connected, the respective functional components 103 to 108 can be distributed across the plurality of information processing apparatuses. In addition, the respective functional components 103 to 108 can be configured as hardware to be included in the information processing apparatus 100.

FIG. 2 is a flowchart illustrating processing of the information processing apparatus 100 according to the first exemplary embodiment as one example.

The processing of FIG. 2 starts, for example, at a time when the waiting time estimation system is activated.

In step S201, the setting unit 105 acquires setting information used for the waiting time estimation processing based on the operation of a user through the input apparatus 120 or by acquiring the setting information stored in the memory 110. The count unit 103 initializes the number of objects in the waiting line using the number of objects in the waiting line at a time when the waiting time estimation system is activated. The time is indicated by the acquired setting information.

In step S202, the first passage detection unit 101 and the second passage detection unit 102 detect passage of an object based on signals from the passage sensors included in the first passage detection unit 101 and the second passage detection unit 102. The first passage detection unit 101 is installed near the exit of the waiting line and detects an object exiting the waiting line. The second passage detection unit 102 is installed near the entrance of the waiting line and detects an object entering the waiting line.

In step S203, the count unit 103 acquires the number of objects present in the waiting line based on the results of the detection processing by the first passage detection unit 101 and the second passage detection unit 102.

In step S204, based on the results of the detection processing by the first passage detection unit 101, the passage frequency calculation unit 104 acquires the frequency of an object that has exited the waiting line within a set time period as the first passage frequency. For example, by dividing by the set time period the number of objects that has exited the waiting line within the set time period, the passage frequency calculation unit 104 acquires the number of objects that exit from the waiting line per unit time period as the first passage frequency. The passage frequency calculation unit 104 can store the acquired first passage frequency in the memory 110 or the like. The passage frequency calculation unit 104 can calculate the second passage frequency based on the number of objects that enter the waiting line within the set time period. The passage frequency calculation unit 104 can correct the calculated first passage frequency and second passage frequency by using Equations 2 and 3 described below in the description of step S205.

In step S205, the waiting time estimation unit 106 performs the waiting time estimation at a time of the waiting time estimation indicated by the setting information determined in step S201 in a following manner. That is, the waiting time estimation unit 106 acquires an estimated value of waiting time in the waiting line based on the number of objects acquired in step S203 and the first passage frequency acquired in step S204. The waiting time estimation unit 106 then records the acquired waiting time in the memory 110 or the like. The waiting time estimation unit 106 acquires a value estimated as waiting time in the waiting line, for example, by using following Equation 1:

$$WTp = QL/(\gamma TH'exit + (1-\gamma)TH'entry) \quad \text{(Equation 1)}$$

WTp: Estimated Waiting Time
QL: Number of Objects
TH'exit: Corrected Passage Frequency (Exit (Getting-in Gate))
TH'entry: Corrected Passage Frequency (Entrance (Entering Gate))
$\Gamma$: Exit Reflecting Coefficient ($0 \leq \gamma \leq 1$)

In the present exemplary embodiment, $\gamma=1$. TH'exit in Equation 1 indicates the corrected first passage frequency. TH'entry indicates the corrected second passage frequency. In step S204, the passage frequency calculation unit 104 calculates the corrected passage frequencies in Equation 1 using following Equations 2 and 3:

$$TH'exit = Kp \cdot THexit + Kd \cdot \frac{dTHexit}{dt} + Ki \cdot \int THexit\, dt \quad \text{(Equation 2)}$$

THexit: Actually Calculated Passage Frequency (Exit (Getting-in Gate))
Kp, Kd, and Ki: Coefficient $$TH'entry = Kp \cdot THentry + Kd \cdot \frac{dTHentry}{dt} + Ki \cdot \int THentry\, dt \quad \text{(Equation 3)}$$

THentry: Actually Calculated Frequency (Entrance (Entering Gate))
Kp, Kd, and Ki: Coefficient In the present exemplary embodiment, the passage frequency calculation unit 104 calculates the corrected passage frequencies using Equations 2 and 3 where Kp=1, Kd=0, and Ki=0. In other words, in the present exemplary embodiment, the corrected passage frequency has the same value as the original passage frequency. The passage frequency calculation unit 104 can use values of the coefficients Kp, Kd, and Ki, which are adjusted such that the waiting time calculated using Equations 1 to 3 for an actual waiting line matches the actually observed waiting time. In addition to the method using Equations 1 to 3, the waiting time estimation unit 106 can calculate an estimated value of waiting time in the waiting line using a method of making a correction based on differential value representing tendency of change amount and tendency of past data.

The setting unit 105 can previously determine the initial value of passage frequency as setting information in consideration of a case where the passage frequency becomes 0, for example, when the waiting time estimation system is activated. In addition, when the passage frequency is 0, the display unit 108 can display preset information, e.g., a character string such as "Measuring Waiting Time", on the display apparatus 130.

In step S206, the display unit 108 displays information indicating the estimated value of the waiting time acquired in step S205 on the display apparatus 130. The display unit 108 can display on the display apparatus 130 information such as a past estimated value of waiting time, the first passage frequency, and the second passage frequency.

In step S207, the communication unit 107 determines whether to transmit the information about the waiting time acquired in step S205 to an external terminal device based on, for example, the setting information stored in the memory 110 and a request from an external terminal device. If the communication unit 107 has determined that the information about the waiting time acquired in step S205 is to be transmitted to the external terminal device, the communication unit 107 transmits the information about the waiting time acquired in step S205 to the external terminal device.

In step S208, the waiting time estimation unit 106 determines, based on, for example, an operation by a user through the input apparatus 120, whether an instruction to terminate the acquiring processing of waiting time in the waiting line has been accepted. The waiting time estimation unit 106 terminates the processing of FIG. 2 if the waiting time estimation unit 106 determines that an instruction to terminate the acquiring processing of waiting time in the waiting line has been accepted (Yes in step S208). If the waiting time estimation unit 106 determines that an instruction to terminate the acquiring processing of waiting time in the waiting line has not been accepted (No in step S208), the processing proceeds to step S202.

In the description of FIG. 2, steps S203, S204, and steps S206 and S207 are described as sequential processing. The count unit 103, the passage frequency calculation unit 104, and the waiting time estimation unit 106 can, for example, write the calculation results in steps S203, S204, and S205 in a database or a file stored in the memory 110. The waiting time estimation unit 106, the display unit 108, and the communication unit 107 can then perform processing for reading the contents of a databases or a file stored in the memory 110 as processing independent from the processing of steps S203 to S205 in parallel with the processing of steps S203 to S205.

The waiting time estimation system and the external terminal device can be connected through a network and the external terminal device can request the communication unit 107 to transmit the waiting time data and the like. In response to the request, the external terminal device can display data transmitted from the communication unit 107 on a display apparatus of the terminal device.

Figure 3A:
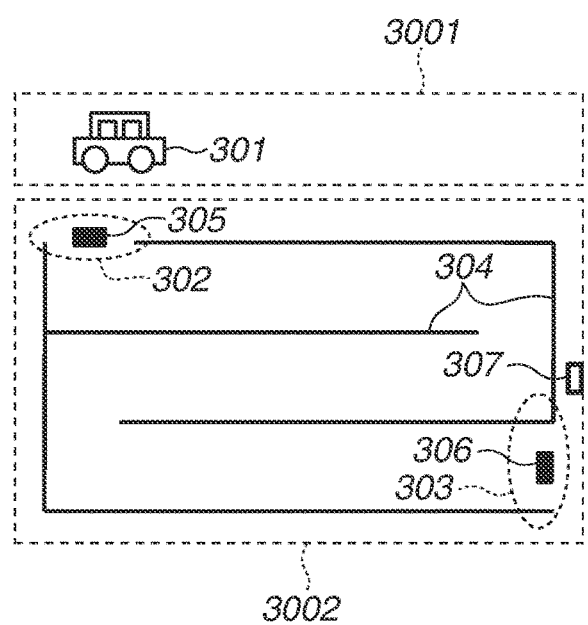
FIGS. 3A and 3B illustrate application of the waiting time estimation system as an example.
Figure 3B:
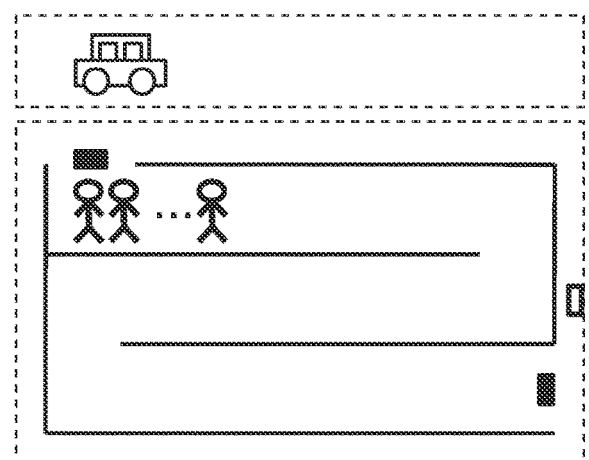

Next, an operation example of the waiting time estimation system when the processing of the flowchart of FIG. 2 is performed will be described. In the example of FIGS. 3A and 3B, the first passage detection unit 101 and the second passage detection unit 102 include infrared sensors.

FIGS. 3A and 3B illustrate an exemplary application of the waiting time estimation system. An example in which the processing of the waiting time estimation system is applied to a line at a taxi stand will be described with reference to FIGS. 3A and 3B.

FIG. 3A illustrates a taxi stand depicting a taxi 301 arriving within an area 3001. Area 3002 is an area where people waiting for a taxi line up.

Within the area 3002, there is an exit 302 that is a place for a person to get in a taxi and an entrance 303 that is a place to enter the area 3002. Guide signs 304 specifies the area 3002 and prompts the people waiting for a taxi to form a line. Instead of the guide signs 304, a line or the like for indicating a place to enter the area 3002 and a route of the line can be drawn on the floor.

An infrared sensor 305, which is the first passage detection unit 101, is installed above the exit 302. An infrared sensor 306, which is a second passage detection unit 102, is installed above the entrance 303. A display monitor 307 corresponding to the display apparatus 130 for presenting estimated waiting time is installed near the entrance 303.

The example in FIG. 3A illustrates a state where a waiting line is not yet formed and there is no person in the area 3002.

Since no waiting line for taxis is formed as illustrated in FIG. 3A, the number of waiting people is zero in the count in step S203 in the processing flow described in the flowchart of FIG. 2. Thus, regardless of passage frequency, waiting time estimated in step S205 is zero minutes (none). This is because QL of Equation 1 becomes 0, so that an estimated value of waiting time in the waiting line calculated using Equation 1 becomes zero.

Figure 4:
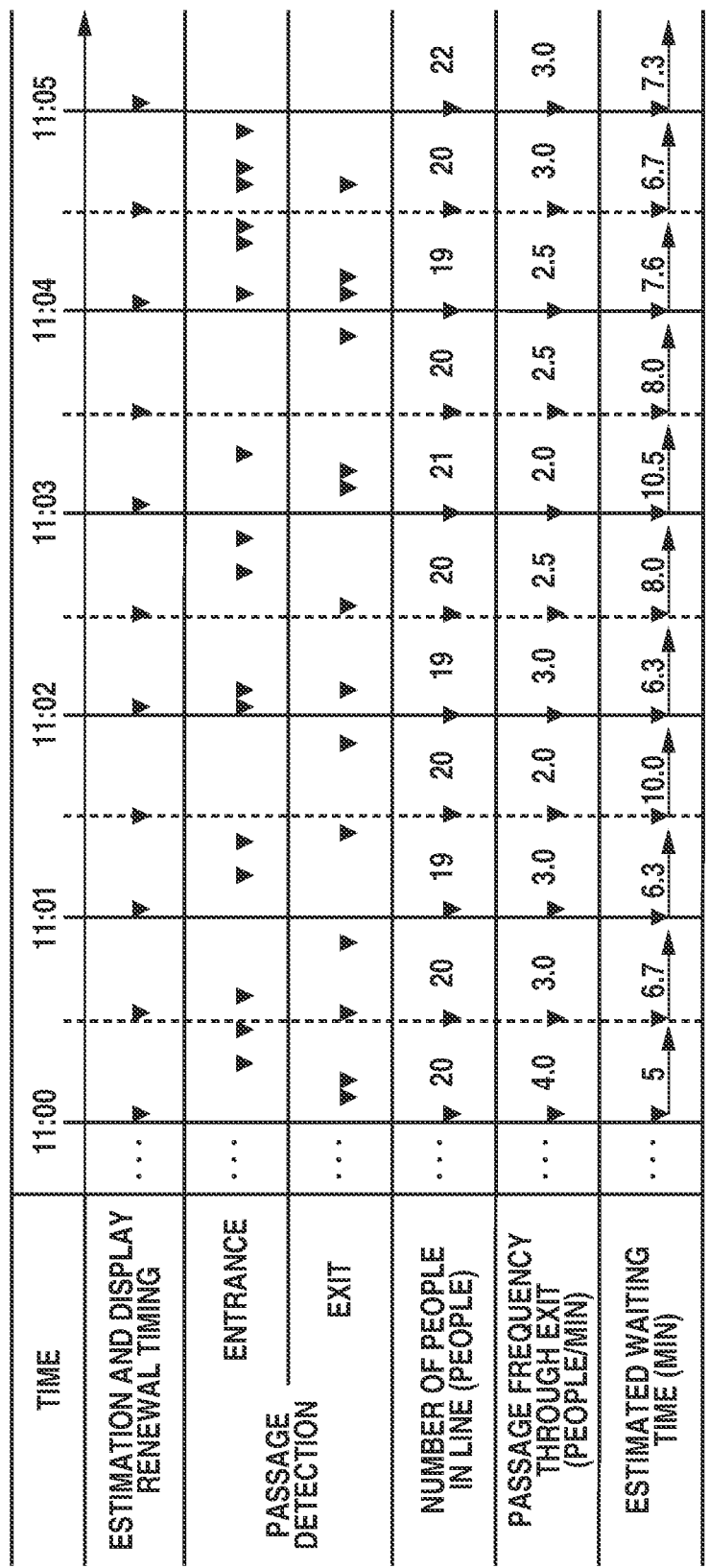
FIG. 4 is a result of waiting time estimation processing as an example.

Next, FIG. 3B illustrates a state that has changed from the state illustrated in FIG. 3A. In the new state, a waiting line is formed, and some people have gotten into a taxi. FIG. 4 is an example of result of waiting time estimation processing in the state of FIG. 3B. The table of FIG. 4 is an exemplary table displayed on the display monitor 307 by the waiting time estimation system.

Downward pointing triangular symbols in the table of FIG. 4 are symbols representing times at which events occur. In the example of FIG. 4, the waiting time estimation system performs the processing of FIG. 2 every 30 seconds. In the example of FIG. 4, the waiting time estimation unit 106 calculates the corrected passage frequency that is the first passage frequency after correction. In this case, the corrected passage frequency is a value obtained by dividing the number of detected passages through the exit within two minutes before the calculation, by two minutes. That is, the waiting time estimation unit 106 calculates TH'exit using Equation 2 where Kp=2, Kd=0, and Ki=0. For example, in step S201, the setting unit 105 determines how much the values of the coefficients Kp, Kd, and Ki are to be set, and stores the determined information as setting information in the memory 110 or the like.

Since the estimated waiting time is calculated by using Equation 1, it is necessary to prevent a denominator on the right side of Equation 1 from becoming zero. Therefore, when there is no human body in the waiting line that passes through the entrance and the exit of the waiting line within a set time period, in order to prevent the first passage frequency and the second passage frequency from becoming zero, the passage frequency calculation unit 104 calculates corrected passage frequency using elapsed time from the latest detection of passage of a human body as a unit time. For example, when one person has passed through the exit within a set time period including time 5 minutes before and no person has passed after that, the passage frequency calculation unit 104 calculates the corrected passage frequency of the first passage frequency and $1/5=0.2$ is obtained.

In the example of FIG. 4, waiting time calculated by the waiting time estimation unit 106 using Equation 1 is displayed in minutes. However, when the waiting time is less than or equal to a set threshold, e.g., for example, 3 minutes, the display unit 108 can display a character string such as "Waiting Time is 3 Minutes or Less" on the display monitor 307.

As described above, in the present exemplary embodiment, the waiting time estimation system calculates an estimated value of waiting time in the waiting line based on the number of people in the waiting line and frequency of the people exiting the waiting line. As a result, the waiting time estimation system can more accurately estimate the waiting time in the waiting line even when service time is not constant.

In addition, since the first passage detection unit 101 and the second passage detection unit 102 detect passage of people at the exit and the entrance in the waiting line, information about the people who enter/exit the waiting line does not need to be acquired individually at the timing of the entrance/exit.

In the above-described example of the present exemplary embodiment, the waiting time estimation system acquires an estimated value of waiting time in the waiting line of taxis. However, the waiting time estimation system can acquire the estimated value of waiting time in, for example, a waiting line formed to enter a restaurant, a waiting line at a cash register in a store, a waiting line at an airport counter, or a waiting line at an airport security check.

A second exemplary embodiment will be described below. In the first exemplary embodiment, the waiting time estimation system detects human bodies in the waiting line that pass through the entrance and the exit using the first passage detection unit 101 and the second passage detection unit 102, which are infrared sensors.

In the second exemplary embodiment, the waiting time estimation system detects human bodies in the waiting line passing through the entrance and the exit based on images of the waiting line captured by an imaging apparatus 501.

Figure 5:
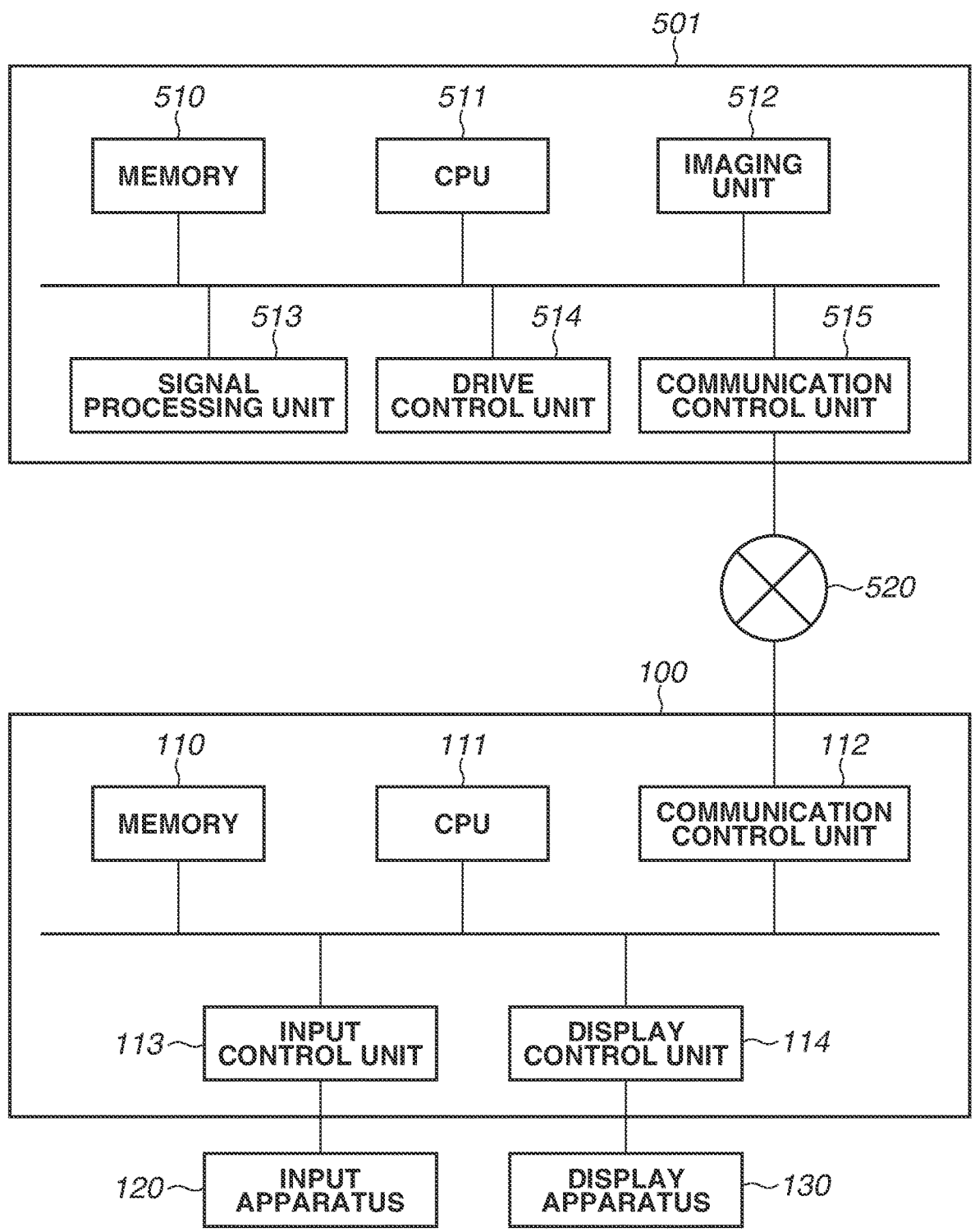
FIG. 5 illustrates a system configuration of a waiting time estimation system as an example.

FIG. 5 illustrates an exemplary system configuration of the waiting time estimation system according to the present exemplary embodiment.

The waiting time estimation system according to the present exemplary embodiment includes an information processing apparatus 100 and an imaging apparatus 501. The information processing apparatus 100 and the imaging apparatus 501 are communicably connected through a network 520. The network 520 can include, for example, a plurality of routers, switches, and cables that satisfy communication standards such as Ethernet. In the present exemplary embodiment, any communication standards, scales, and configurations are acceptable as long as they allow communication between the imaging apparatus 501 and the information processing apparatus 100. For example, the network 52 can include the Internet, a wired local area network (LAN), a wireless LAN, and a wide area network (WAN).

The imaging apparatus 501 is an imaging apparatus such as a network camera. In the present exemplary embodiment, the information processing apparatus 100 drives the imaging apparatus 501, acquires captured images from the imaging apparatus 501, and perform other operations. An exemplary hardware configuration of each system component of the waiting time estimation system will be described with reference to FIG. 5.

The hardware configuration of the information processing apparatus 100 of the present exemplary embodiment is similar to the first exemplary embodiment. The CPU 111 performs processing based on a program stored in the memory 110 or the like, thereby realizing functions of the information processing apparatus 100 described below with reference to FIG. 6 and the processing of the flowchart of FIG. 2.

The imaging apparatus 501 includes a memory 510, a CPU 511, an imaging unit 512, a signal processing unit 513, a drive control unit 514, and a communication control unit 515.

The memory 510 is a storage device that stores various programs, various types of setting data, image data obtained by photographing a waiting line, and the like. The CPU 511 is a central processing unit that controls the processing of the imaging apparatus 501.

The imaging unit 512 includes an image sensor and an optical system, and captures an image with an intersection of the optical axis of the optical system and the image sensor as an imaging center. The image sensor is sensor such as a complementary metal-oxide semiconductor (CMOS) sensor or a charged coupled device (CCD) sensor.

The signal processing unit 513 performs signal processing on an image signal obtained by capturing an image by the imaging unit 512. For example, the signal processing unit 513 codes an image signal of an image captured by the imaging unit 512 The signal processing unit 513 can use a variety of coding schemes such as Joint Photographic Experts Group (JPEG), H.264/MPEG-4 AVC (hereinafter referred to as H.264), or High Efficiency Video Coding (HEVC).

The drive control unit 514 controls the imaging unit 512 to change an imaging direction and an imaging angle of view. In the present exemplary embodiment, the imaging unit 512 can change the imaging direction to a panning direction or a tilt direction. The imaging apparatus 501 does not need to be able to change the imaging direction or change the angle of view.

The communication control unit 515 is a unit used for communication with an external device, such as the information processing apparatus 100, through the network 520. The communication control unit 515 transmits information of the captured image on which processing has been performed by the signal processing unit 513 to the information processing apparatus 100. The communication control unit 515 receives a control command for the imaging apparatus 501 transmitted from the information processing apparatus 100.

The CPU 511 performs processing based on a program stored in the memory 510 or the like, thereby realizing functions of the imaging apparatus 501 and processing of the imaging apparatus 501.

Figure 6:
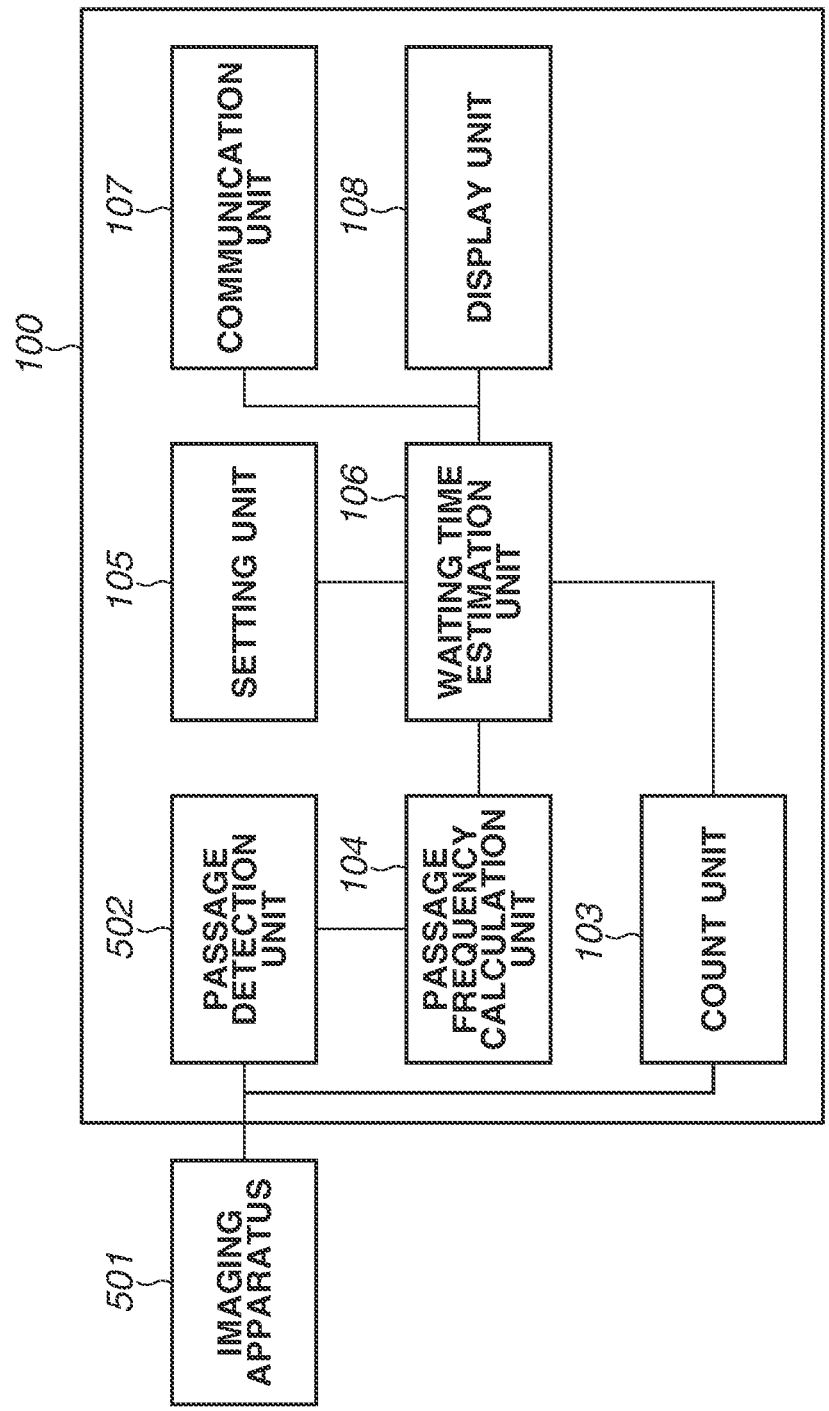
FIG. 6 illustrates a functional configuration of an information processing apparatus as an example.

FIG. 6 illustrates an exemplary functional configuration of the information processing apparatus 100 according to the present exemplary embodiment. The information processing apparatus 100 according to the present exemplary embodiment includes a passage detection unit 502, a count unit 103, a passage frequency calculation unit 104, a setting unit 105, a waiting time estimation unit 106, a communication unit 107, and a display unit 108. The information processing apparatus 100 of the present exemplary embodiment is different from the first exemplary embodiment in that it includes the passage detection unit 502. The setting unit 105, the waiting time estimation unit 106, the communication unit 107, and the display unit 108 are similar to those in the first exemplary embodiment, and descriptions thereof will not be repeated.

The passage detection unit 502 detects passage through the entrance and the exit in a waiting line of objects. In the present exemplary embodiment, the passage detection unit 502 acquires an image of the waiting line from the imaging apparatus 501. The passage detection unit 502 detects passage of an object based on the image acquired from the imaging apparatus 501. The imaging apparatus 501 is installed such that the imaging apparatus 501 can photograph the entire waiting line.

The passage detection unit 502 acquires an image captured by the imaging apparatus 501 as a moving image (a plurality of sequential images at a set interval). The passage detection unit 502 processes and analyzes each image included in the acquired moving image to detect an object. The passage detection unit 502 then detects passage of the object at set positions, e.g., the entrance and the exit of the waiting line, based on temporal change of the position of the object. The passage detection unit 502 can determine a plurality of positions for detecting passage of an object in images. The passage detection unit 502 can detect passage of an object through each determined position.

The count unit 103 detects objects from an image obtained by the imaging apparatus 501 through image processing and image analysis, and counts the number of detected objects. In a case where the imaging apparatus 501 photographs an object existing in an area other than the line, the count unit 103 can be configured to detect objects coming just from the preset area within an image to count the objects.

The passage frequency calculation unit 104 calculates frequency of an object passing through the set position within the preset time period based on passage of the object through the set positions detected by the passage detection unit 502. The passage frequency calculation unit 104 calculates the passage frequency based on the state of the waiting line and a renewal interval in displaying estimated waiting time.

An exemplary processing of the information processing apparatus 100 according to the second exemplary embodiment will be described with reference to FIG. 2. The processing in the flowchart of FIG. 2 starts, for example, when the waiting time estimation system is activated. The processing in step S201 is similar to that in the first exemplary embodiment.

In step S202, the passage detection unit 502 detects passage of an object through the set position (the entrance or the exit of the waiting line) based on an image of the waiting line captured by the imaging apparatus 501. In step S203, the count unit 103 analyzes the image captured by the imaging apparatus 501 and counts objects in the waiting line. In step S204, the passage frequency calculation unit 104 calculates passage frequency through the set position of objects within the set time period based on detection of passage of an object by the passage detection unit 502.

Also in the present exemplary embodiment, similar to the first exemplary embodiment, the passage frequency calculation unit 104 acquires frequency of an object that has exited the waiting line within the set time period as first passage frequency. In addition, the passage frequency calculation unit 104 acquires frequency of an object that has entered the waiting line within the set time period as second passage frequency. The passage frequency calculation unit 104 can store the acquired first passage frequency in the memory 110 or the like.

The processing of steps S205 to S208 is similar to that of the first exemplary embodiment. In step S204, the passage frequency calculation unit 104 calculates the corrected first passage frequency and the corrected second passage frequency using Equations 2 and 3 similar to the first exemplary embodiment, but coefficients of Equations 2 and 3 are different from those in the first exemplary embodiment.

In the present exemplary embodiment, the passage frequency calculation unit 104 calculates the corrected first passage frequency and the corrected second passage frequency using Equations 2 and 3 where $\gamma=1$, $Kp=1$, $Kd=0.1$, $Ki=0$ in step S204. In the present exemplary embodiment, the coefficient Kd in Equations 2 and 3 is 0.1, and thus the time differential values of the first passage frequency and the second passage frequency are reflected. Therefore, the passage frequency calculation unit 104 can calculate the corrected first passage frequency and the corrected second passage frequency in which historical tendency of passage of an object is reflected.

As a result, the waiting time estimation unit 106 can calculate an estimated value of the waiting time in which historical tendency of passage of an object is reflected. As a result, the waiting time estimation unit 106 can acquire a more accurate estimated value of waiting time in which the historical tendency of passage of an object is also taken into consideration.

Since $\gamma=1$ in the present exemplary embodiment, the waiting time estimation unit 106 calculates an estimated value of waiting time taking only the frequency of an object exiting the waiting line into consideration. However, by setting the value of $\gamma$ to a value other than 1, the waiting time estimation unit 106 can calculate an estimated value of waiting time taking not only the frequency of an object exiting the waiting line but also the frequency of an object entering the waiting line into consideration.

In the description of FIG. 2, steps S203, S204, and steps S206 and S207 are described as sequential processing. The count unit 103, the passage frequency calculation unit 104, and the waiting time estimation unit 106 can write the calculation results in steps S203, S204, and S205 in a database or a file stored in the memory 110. The waiting time estimation unit 106, the display unit 108, and the communication unit 107 can then read the contents of a database or a file stored in the memory 110 as processing independent from the processing of steps S203 to S205, and in parallel to the processing of steps S203 to S205.

The waiting time estimation system and the external terminal device can be connected through a network. The external terminal device can request the communication unit 107 to transmit the waiting time data and the like, and in response to the request, the external terminal device can display data transmitted from the communication unit 107 on a display apparatus of the terminal device.

FIGS. 7A to 7F illustrate exemplary application of the waiting time estimation system.

Figure 7A:
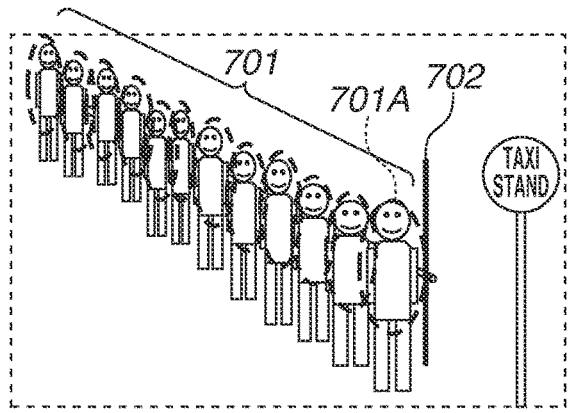
FIGS. 7A to 7F illustrate application of the waiting time estimation system as an example.

FIG. 7A illustrates an exemplary image of a waiting line for taxis captured by the imaging apparatus 501. The passage detection unit 502 and the count unit 103 detect upper bodies of human bodies from the image of FIG. 7A, thereby detecting human bodies. A detected human body frame 701 is a frame indicating the upper bodies of the detected human bodies. The display unit 108 can generate the detected human body frame 701 based on a detected center position and a size of the upper bodies of the human bodies, and display the detected human body frame 701 over the image captured by the imaging apparatus 501 on the display apparatus 130 or the like.

A passage detection segment 702 is a segment indicating a portion through which an object passes to be detected. The setting unit 105 can determine the passage detection segment 702 as follows as an example. The setting unit 105 instructs the display unit 108 to display, on the display apparatus 100, a passage detection segment specifying screen that is used to specify the passage detection segment 702. The passage detection segment specifying screen includes the image captured by the imaging apparatus 501.

The setting unit 105 then accepts specification of the passage detection segment 702 performed by a user who operates on the passage detection segment specifying screen through the input apparatus 120. For example, the user draws a segment by dragging a mouse at a position where the user desires to specify the passage detection segment on an image captured by the imaging apparatus 501 included in the passage detection segment specification screen, thereby specifying passage detection segment 702. The setting unit 105 can accept such specification from the user and determine the segment indicated by the accepted specification as the passage detection segment 702.

Figure 7B:
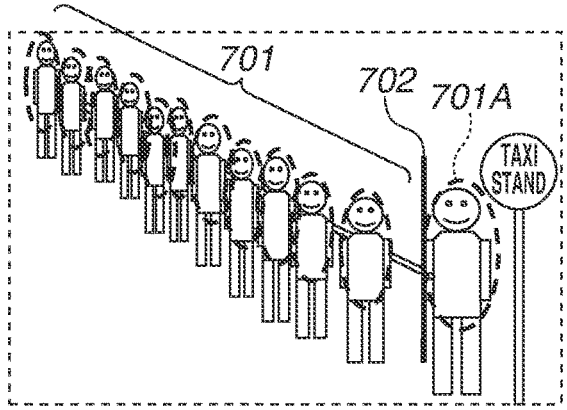

When a person detected as a detected human body frame 701A moves forward, as illustrated in FIG. 7B, to get in a taxi, in step S202, the passage detection unit 502 tracks the person corresponding to the detected human body frame 701A. The passage detection unit 502 recognizes that the person corresponding to the detected human body frame 701A in FIG. 7B has passed through the passage detection segment 702 from the state of FIG. 7A. As described above, the passage detection unit 502 recognizes whether a certain person has passed through the passage detection segment 702 based on change in position of the same person in consecutive image frames in the moving image acquired from the imaging apparatus 501.

Figure 7C:
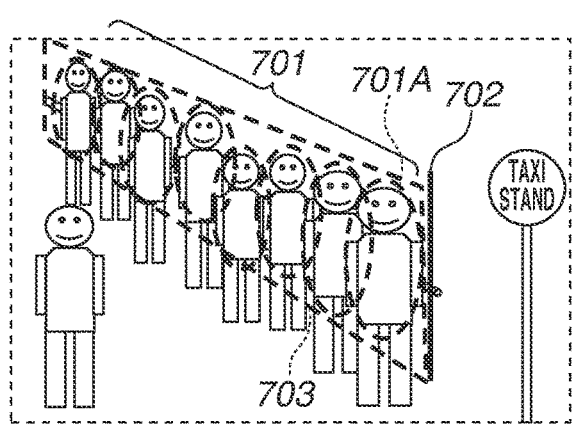
Figure 7D:
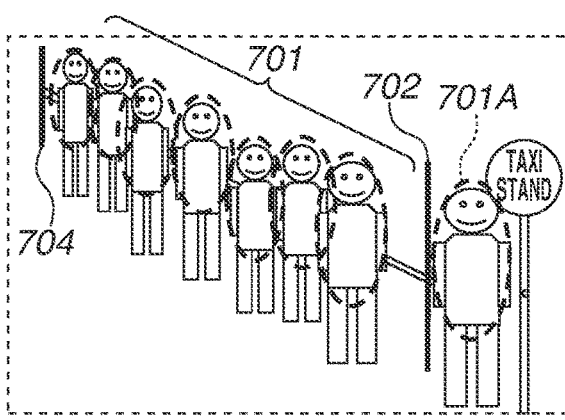
Figure 7E:
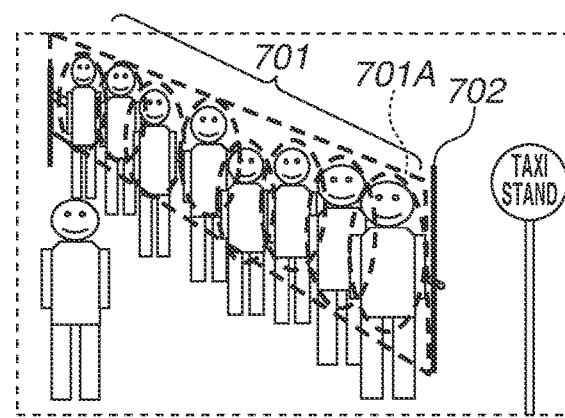
Figure 7F:
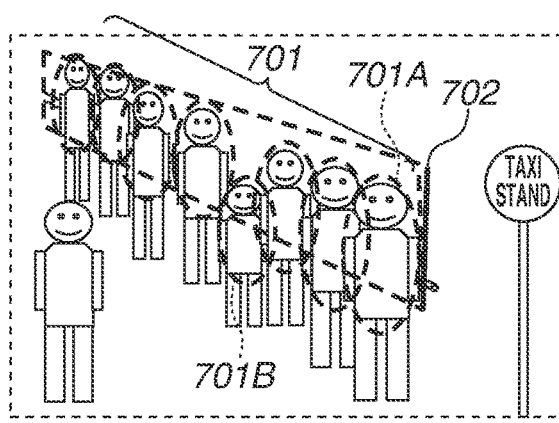
Figure 8:
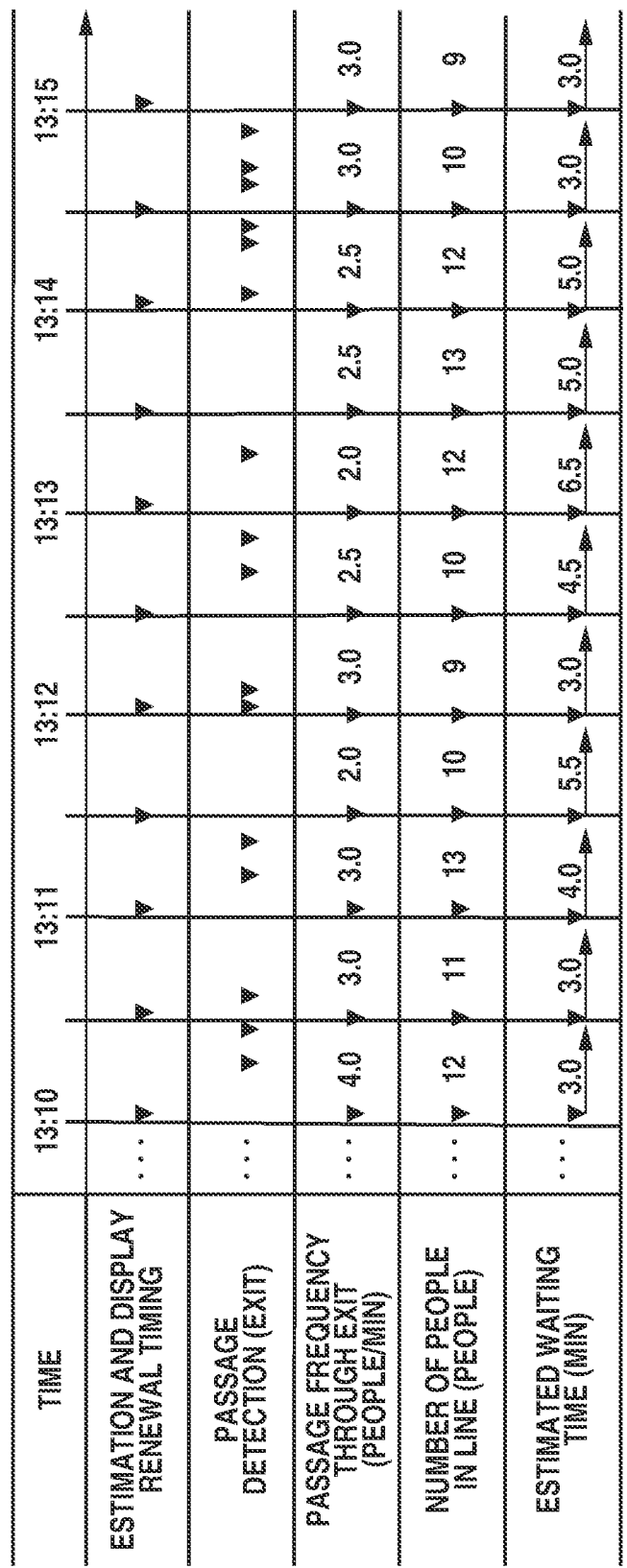
FIG. 8 is a result of waiting time estimation processing as an example.

FIG. 8 is an example result of waiting time estimation processing in the state illustrated in FIG. 7. The table in FIG. 8 is an example table displayed on the display apparatus 130 by the waiting time estimation system. Downward pointing triangular symbols in the table of FIG. 8 represent the timing at which events occur. In the example of FIG. 8, the waiting time estimation system performs the processing of FIG. 2 every 30 seconds.

In step S203, the count unit 103 counts the number of human bodies, which are objects, existing in the image of FIG. 7B. When the count unit 103 counts the number of objects from the image captured by the imaging apparatus 501 in step S203, the count unit 103 can detect objects from a set area in the image and count the number of the detected objects. An area 703 in FIG. 7C is an example area for counting objects that is set to distinguish people in the waiting line from passersby.

The setting unit 105 can determine the area for counting objects as follows. The setting unit 105 instructs the display unit 108 to display, on the display apparatus 130, an area specification screen used for specifying an area for counting objects. The area specification screen includes an image captured by the imaging apparatus 501. The setting unit 105 accepts specification of an area for counting objects specified by a user, according to an operation on the area specification screen by the user through the input apparatus 120.

For example, the user specifies an area by clicking points of an area using a mouse where the user desires to specify as corners on an image captured by the imaging apparatus 501 included in the area specification screen. The setting unit 105 can accept such specification from the user and determine the area indicated by the points of the accepted specification as the area 703.

The setting unit 105 can determine the passage detection segment for detecting people entering the waiting line in the image captured by the imaging apparatus 501. A passage detection segment 704 in FIG. 7D is an example segment used for detecting an object entering the waiting line. The setting unit 105 can determine the passage detection segment 704 in the same manner as the passage detection segment 702.

In addition, as illustrated in FIG. 7E, the setting unit 105 can determine the passage detection segment for detecting an object exiting the waiting line and the area for counting objects, within the imaging apparatus 501. The waiting time estimation system then counts the number of objects in the waiting line by using one of or both the passage detection segment for detecting an object exiting the waiting line and the area for counting objects.

The count unit 103 can use both of the passage detection segments within one image to count the number of objects in the waiting line. One of the passage detection segments is used to detect an object exiting the waiting line and the other of the passage detection segments is used to detect an object entering the waiting line.

In the present exemplary embodiment, the waiting line is a line of people waiting for taxis. Since it is assumed that a child typically does not enter a taxi alone, but does so with an adult, the waiting time estimation system can regard just adults as people in the waiting line.

It can be assumed that children are shorter than adults. Therefore, in this case, the setting unit 105 determines a position of the area 703 for counting objects and a position of the passage detection segment 702 to be higher than those in the case of FIG. 7C, as illustrated in FIG. 7F, such that the whole upper bodies of children are not included. As a result, the count unit 103 and the passage detection unit 502 can detect upper bodies of adult human bodies without detecting upper bodies of child human bodies. In addition, the count unit 103 and the passage detection unit 502 detect human bodies by detecting upper bodies of human bodies. Thus, human bodies can be more accurately detected comparing to detection of the whole human bodies.

When the waiting line is a line of people waiting for an amusement facility for children, it is assumed that adults do not use the amusement facility. Therefore, the waiting time estimation system can regard the objects in the waiting line as children. It can be assumed that adults are taller than children. Therefore, in this case, the setting unit 105 determines that a position of the area 703 for counting objects and a position of the passage detection segment 702 are to be lower than those in the case of FIG. 7C, so that the whole upper bodies of the adult are not included. As a result, the count unit 103 and the passage detection unit 502 can detect upper bodies of child human bodies without detecting upper bodies of adult human.

In the present exemplary embodiment, the imaging apparatus 501 is installed to photograph the waiting line from an oblique direction. Such an installation enables the imaging apparatus 501 to photograph human bodies in the waiting line without overlapping with each other. Thus, the waiting time estimation system can more accurately detect human bodies from an image.

The passage detection unit 502 detects passage of an object through the passage detection segments 702 and 704 by detecting the same object in both ends of the area spanning the passage detection segments 702 and 704 within the image. For example, if the passage detection segment 702 exists near the right end of the image, an area on the right side of the passage detection segment 702 becomes so narrow that the entire object cannot be photographed, and the passage detection unit 502 cannot detect the object.

Therefore, the setting unit 105 can determine that positions of the passage detection segments 702 and 704 are set such that both ends of the area spanning the passage detection segments 702 and 704 within the image have a size enabling detection of an object. For example, the setting unit 105 can determine positions of the passage detection segments 702 and 704 such that both ends of the area spanning the passage detection segments 702 and 704 within the image have a size that is larger than the size of an object to be detected. Accordingly, the passage detection unit 502 can more stably detect an object passing through the passage detection segments 702 and 704 and accuracy of waiting time estimation can be improved.

As described above, according to the present exemplary embodiment, the waiting time estimation system counts the number of people in the waiting line and detects people exiting the waiting line based on an image of the waiting line acquired by the imaging apparatus 501. In this manner, the waiting time estimation system can perform waiting time estimation processing based on an image of the waiting line. Thus, devices such as infrared sensors for detecting passage of people do not need to be individually installed at set positions of a waiting line. Therefore, a configuration of the waiting time estimation system can be simplified.

A third exemplary embodiment will be described below. In the second exemplary embodiment, it is assumed that the single imaging apparatus 501 photographs the entire waiting line. In the present exemplary embodiment, an area in which a waiting line exists is larger than the second exemplary embodiment, and a plurality of imaging apparatuses photographs each portion of the waiting line. In addition, in the first and second exemplary embodiments, there is one exit of the waiting line. In the present exemplary embodiment, there is a plurality of exits of the waiting line.

The system configuration of the waiting time estimation system according to the present exemplary embodiment, the hardware configuration, and the functional configuration of the respective system components are similar to those of the second exemplary embodiment. In the present exemplary embodiment, the imaging apparatus 501 includes a plurality of imaging apparatuses.

FIG. 9 illustrates exemplary application of the waiting time estimation system in the present exemplary embodiment. An exemplary waiting line at a taxis stand on which the waiting time estimation processing is performed will be described with reference to FIG. 9. Differences from FIG. 3 will be described.

Areas 9001 and 9002 are areas where taxis arrive. Taxis do not arrive at one, but rather two areas. Taxis 901 and 902 respectively arrive within ranges of the areas 9001 and 9002.

An area 9003 is an area where people waiting for a taxi line up. The area 9003 is larger than the area 3002 and includes two getting-in positions 903 and 904 for passengers of taxis. The getting-in positions 903 and 904 are also exits in the waiting line. For example, an attendant guides people 912 waiting for a taxi near the getting-in position 904 to the getting-in position 903 or the getting-in position 904 where they should wait.

In order to photograph the waiting line at the taxi stand as illustrated in FIG. 9, a plurality of cameras 907 to 909 is installed. Similar to the second exemplary embodiment, images captured by the cameras 907 and 908 are used for detecting passage of an object through the getting-in positions (exits of the waiting line). The cameras 907 to 909 are the imaging apparatus 501 in the present exemplary embodiment.

In order that a count unit 103 can completely count the number of people in the waiting line at the taxi stand based on the images captured by the cameras 907 to 909, the respective cameras 907 to 909 are arranged such that photographing areas thereof overlap with each other. The photographing area 907A in FIG. 9 is an area indicating a photographing range of the camera 907. The photographing area 908A in FIG. 9 is an area indicating a photographing range of the camera 908. The photographing area 909A in FIG. 9 is an area indicating a photographing range of the camera 909.

Figure 10A:
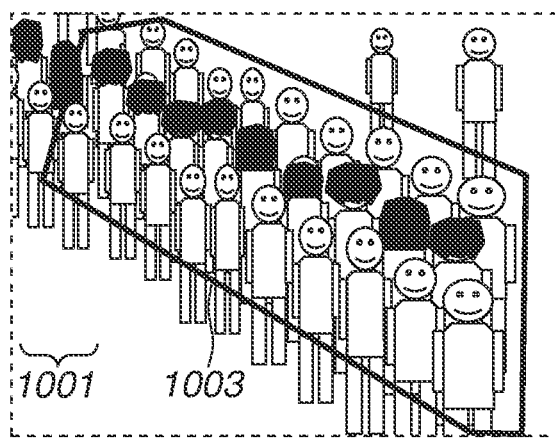
FIGS. 10A and 10B illustrate areas for counting objects as an example.
Figure 10B:
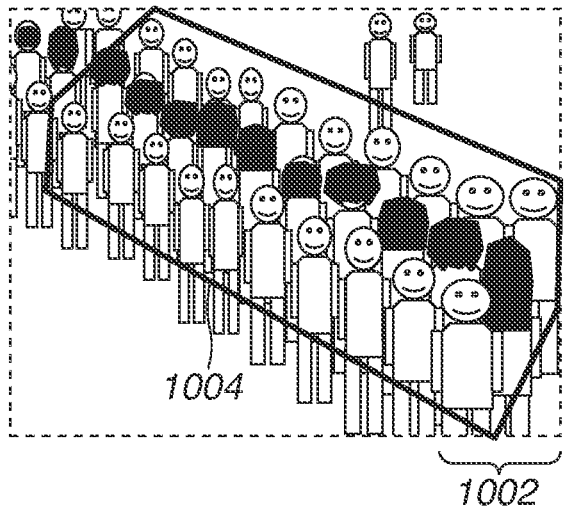

FIG. 10A illustrates an exemplary image captured by the camera 907. FIG. 10B illustrates an exemplary image captured by the camera 908. In this case, the area 1001 and the area 1002 overlap with each other. Thus, the setting unit 105 determines detection target areas 1003 and 1004 such that an object is not detected in duplication. For example, the setting unit 105 determines the areas 1003 and 1004 in a manner similar to the manner in which the area 703 in FIG. 7C is determined in the second exemplary embodiment.

Figure 11:
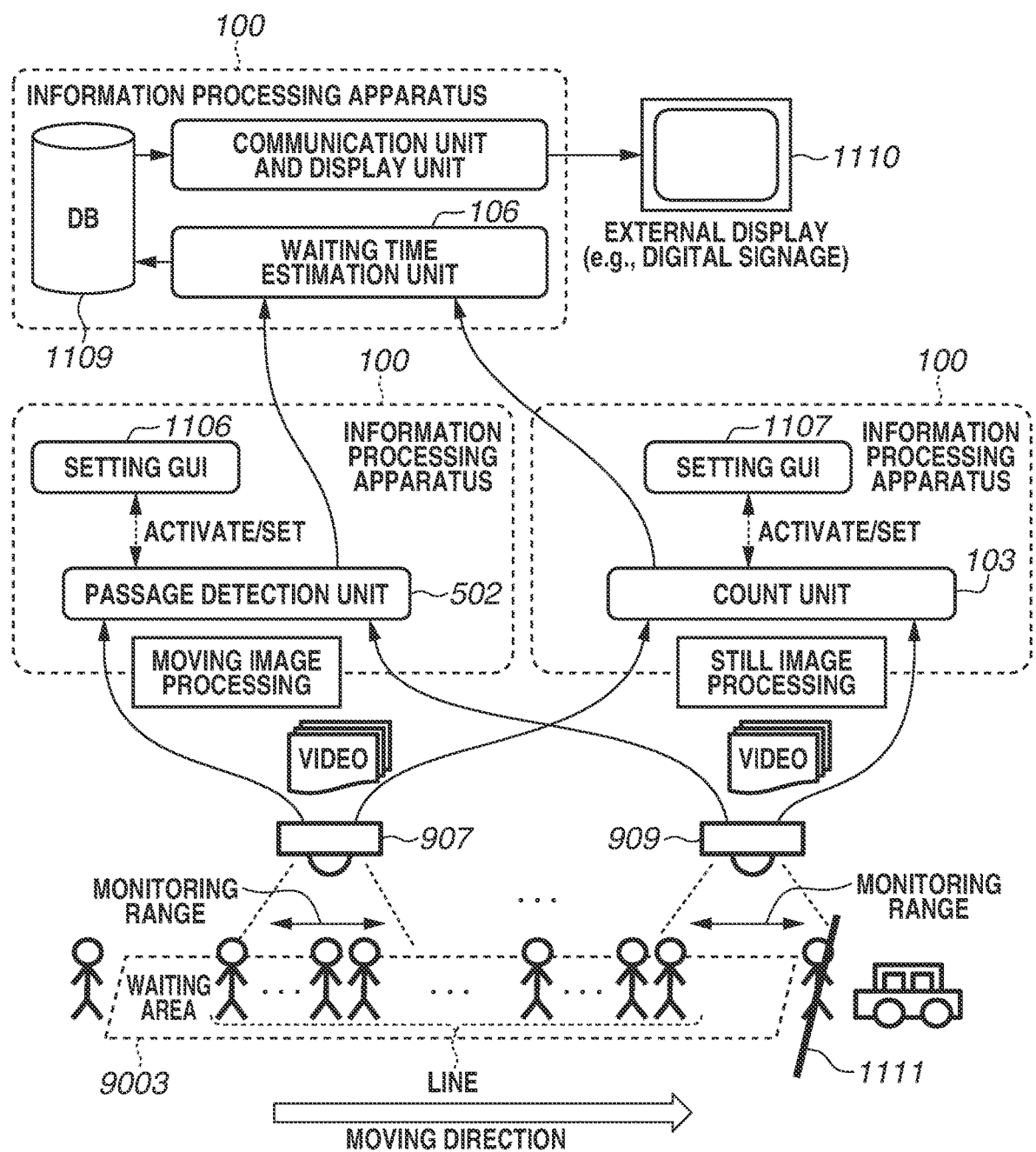
FIG. 11 illustrates a system configuration of the waiting time estimation system as an example.

FIG. 11 illustrates an exemplary system configuration of the time estimation system according to the present exemplary embodiment. A block diagram is illustrated in FIG. 11

The cameras 907 to 909 photograph the waiting line in a taxi waiting area 1101. A passage detection unit 502 in an information processing apparatus 100 detects an object that has passed through a set passage detection segment based on images captured by the cameras 907 to 909, and notifies the time at which the object has passed through the passage detection segment to a waiting time estimation unit 106.

The setting unit 105 determines a segment, which is specified through the passage detection setting graphical user interface (GUI) 1106, as the passage detection segment. The passage detection setting GUI 1106 is used for specifying the passage detection segment. The passage detection segment specification screen described in the second exemplary embodiment is an example of the passage detection setting GUI 1106. In the present exemplary embodiment, the information processing apparatus 100 is a single information processing apparatus. However, when the number of images captured by the cameras 907 to 909 increases and it is difficult for a single information processing apparatus to process all of these images within a set time period, a plurality of information processing apparatuses can distributively process the respective images.

In this case, the information processing apparatus 100 includes a plurality of information processing apparatuses. The cameras 907 to 909 can include a function of counting the number of objects within a set area, and a function of detecting an object that has passed through the set passage detection segment. In this case, the cameras 907 to 909 transmit to the information processing apparatus 100 information such as the number of objects within the set area and the detection result of an object that has passed through the set passage detection segment, in addition to the captured image.

The setting unit 105 determines an area specified through a people count setting GUI 1107 as the area for counting objects. The people count setting GUI 1107 is used for specifying the area for counting objects. The area specification screen described in the second exemplary embodiment is an example of the people count setting GUI 1107.

The count unit 103 counts the number of objects included in the area determined through the people count setting GUI 1107 within images captured by the cameras 907 to 909 at set timing. The waiting time estimation system uses one or more of the images captured by the cameras 907 to 909 based on the waiting state of the waiting line for count processing of objects in the waiting line.

The count unit 103 does not necessarily perform count processing of objects in the waiting line based on a moving image from the imaging apparatus 501, but can perform the count processing based on a still image acquired from the imaging apparatus 501 at set timing.

The load put on resources such as the CPU 111 can be reduced in the count processing of objects within the waiting line when the count unit 103 acquires one still image at a set time compared to the count processing when the count unit 103 acquires a moving image at all times. In addition, this configuration is exemplary because the number of cameras increases that one information processing apparatus can use in count processing of people.

Figure 12:
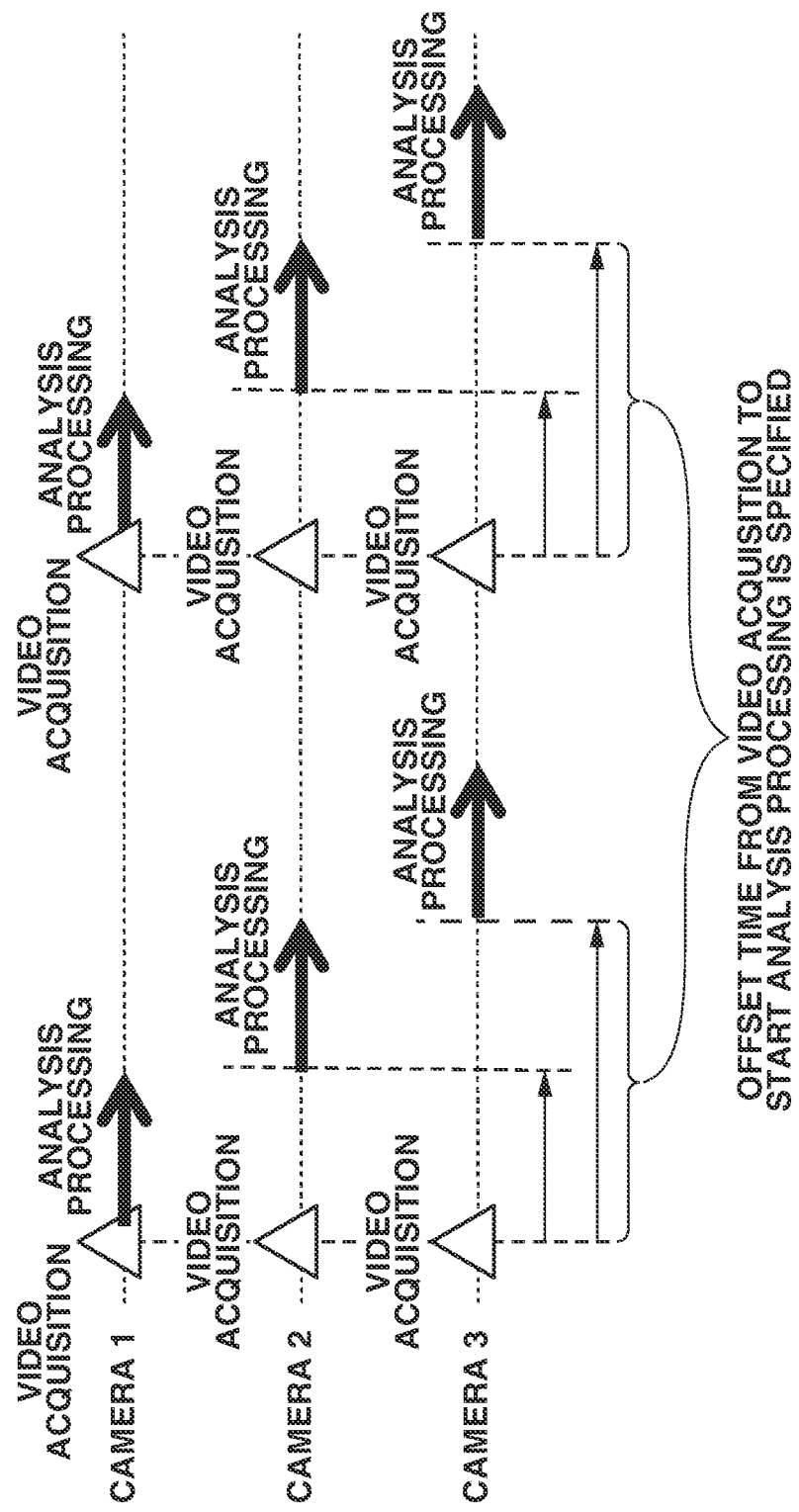
FIG. 12 illustrates processing timing of the waiting time estimation system as an example.

As illustrated in FIG. 12, the waiting time estimation system can acquire images captured at the same time from the cameras, and sequentially start analysis processing on the acquired images, such as count processing of objects in the waiting line and passage detection processing of an object through the passage detection segments. Thus, processing can be performed on images captured at the same time by the plurality of cameras. Therefore, it is possible to avoid redundantly counting the same person who has been moving in the waiting line and photographed by different cameras. This also reduces the processing load on the CPU 111.

When counting the number of objects in the waiting line based on still images captured at regular intervals, the count unit 103 acquires only the number of objects within the waiting line at the time that the still image is captured. In this case, the count unit 103 can count the number of objects within the waiting line at a time other than the time of capturing still images.

More specifically, the count unit 103 acquires the number of objects in the waiting line at a set time based on images captured at the time. After the acquisition, the count unit 103 increments the number of acquired objects by one every time when the passage detection unit 502 detects an object passing through the entrance of the waiting line until next acquisition of still images from the cameras.

In addition, the count unit 103 decrements the number of acquired objects by one each time the passage detection unit 502 detects an object passing through the exit of the waiting line after the acquisition until the next acquisition of still image. Accordingly, the count unit 103 can reduce the load on the CPU 111 by correcting the number of objects in the waiting line each time passage of an object through the entrance or the exit of the waiting line is detected, and in addition, can correctly count the number of people in the waiting line.

The passage frequency calculation unit 104 calculates the first passage frequency, which is frequency of an object that exits the waiting line, based on time when the object has passed through the passage detection segment. The time is transmitted from the passage detection unit 502. The waiting time estimation unit 106 then calculates an estimated value of waiting time based on the calculated first passage frequency and the number of objects in the waiting line counted by the count unit 103. When the waiting line is photographed by a plurality of cameras, the count unit 103 counts the number of objects in the waiting line by summing up the numbers of objects in the set areas for counting objects in the respective images obtained by the plurality of cameras.

The waiting time estimation unit 106 stores the calculated information about the waiting time in the database 1109, which can be a comma separated values (CSV) file or the like stored in the memory 110. The communication unit 107 can transmit the information about the waiting time calculated by the waiting time estimation unit 106 to another external terminal device. In addition, the display unit 108 can display the information on an external monitor 1110 or the like. The monitor 1110 is a display apparatus such as a digital signage device, and is one example of the display apparatus 130. The waiting time estimation unit 106 can store not only the information about the calculated waiting time, but also the information such as time when an object has passed through the passage detection segment, the number of objects in the waiting line, and the like in a database stored in the memory 110. The display unit 108 can display the information stored in the database stored in the memory 110 such as time when an object passes through the passage detection segment, the number of objects in the waiting line, and the like, on the monitor 1110 or the like.

The waiting time estimation system can periodically calculate an estimated value of waiting time and display the calculated estimated value of waiting time on the display apparatus 130 at preset intervals. Alternatively, the waiting time estimation system can calculate an estimated value of waiting time and display the calculated estimated value of waiting time on the display apparatus 130 each time the passage detection unit 502 detects an object that has passed through the entrance and the exit of the waiting line. That is, each time the passage detection unit 502 detects an object that has passed through the entrance and the exit of the waiting line, the count unit 103 counts the number of people in the waiting line. In addition, each time the passage detection unit 502 detects an object that has passed through the entrance or the exit of the waiting line, the passage frequency calculation unit 104 calculates the first passage frequency, the second passage frequency, the corrected first frequency, and the corrected second passage frequency. The waiting time estimation unit 106 then acquires an estimated value of waiting time based on the number counted by the count unit 103 and the passage frequencies calculated by the passage frequency calculation unit 104.

Thus, the waiting time estimation system can present the latest estimated waiting time to people who are about to get in the waiting line. If display frequency on the display apparatus 130 is raised beyond an appropriate rate, visibility of display decreases. Therefore, the display unit 108 can perform processing as follows when passage of an object is detected at the entrance or the exit of the waiting line. That is, the display unit 108 can renew the display on the display apparatus 130 only if the time period from renewal of the display on the display apparatus 130 when a person previously enters or exits the waiting line, until a person enters or exits this time, is longer than a threshold. When no object passing through the entrance or the exit of the waiting line is detected, it is desirable that the waiting time estimation system calculate an estimated value of waiting time and renew the display on the display apparatus 130 when a set time period has elapsed from the latest renewal time of the display on the display apparatus 130.

In the present exemplary embodiment, the setting unit 105 determines only one area for counting the number of people within an image captured by one camera, but as illustrated in FIG. 13A, the setting unit 105 can determine two or more areas.

The setting unit 105 determines one passage detection segment in one image. However, as illustrated in FIG. 13B, when one camera is arranged such that the camera can photograph a plurality of getting-in positions, the setting unit 105 can determine a plurality of passage detection segments within an image captured by the camera. In this case, the passage detection unit 502 detects passage of an object through each passage detection segment. Based on the total of objects that passed through the respective detected passage detection segments, the passage frequency calculation unit 104 calculates the first passage frequency or the second passage frequency.

When the count unit 103 counts the number of objects in an area 913 in FIG. 9, the display unit 108 can display the following information on the display monitor 911 when the counted number of objects in the area 913 becomes less than or equal to a set threshold. That is, the display unit 108 can display information on the display monitor 911 to prompt the people 912 who are waiting in the waiting line and have not entered the area 913 to move to the getting-in position in front.

As described above, according to the processing of the present exemplary embodiment, the waiting time estimation system can acquire an estimated value of waiting time with improved accuracy even when portions of a waiting line are divided and photographed by a plurality of cameras or when a plurality of exits exists in the waiting line.

Other Embodiments

The first to third exemplary embodiments are not seen to be limiting. Various modifications and changes are possible within the scope each of these embodiments.

One or more functions of the above exemplary embodiments can be realized by a program that is provided to a system or an apparatus through a network or a storage medium and read and executed by one or more processors in a computer of the system or the apparatus. The one or more functions can also be realized by a circuit (e.g., application specific integrated circuit (ASIC)).

Although exemplary embodiments have been described in detail above, the present disclosure is not limited to such specific exemplary embodiments. For example, part of or entire functional configuration of the above-described waiting time estimation system can be implemented as hardware in the information processing apparatus 100.

Other Embodiments

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-168215, filed Aug. 30, 2016, which is hereby incorporated by reference herein in its entirety.

What is claimed is:

1. An information processing apparatus that estimates waiting time in a waiting line, the information processing apparatus comprising:
a computer executing instructions that, when executed by the computer, cause the computer to function as:
a first acquisition unit configured to acquire a number of objects in the waiting line;
a second acquisition unit configured to acquire a number of objects passing through a first position in a predetermined period, the first position corresponding to an exit of the waiting line;
an estimation unit configured to perform estimation process for estimating the waiting time based on the number of objects in the waiting line and the number of objects passing through the first position in the predetermined period; and
a display control unit configured to cause a display unit to display information indicating the estimated waiting time,
wherein if the number of objects passing through the first position in the predetermined period is zero, the second acquisition unit acquires a number of objects passing through the first position in an elapsed period that has elapsed since latest passage of an object through the first position, and
wherein the estimation unit configured to perform the estimation process for estimating the waiting time based on the number of objects in the waiting line and the number of objects passing through the first position in the elapsed period.

2. The information processing apparatus according to claim 1, wherein the first acquisition unit acquires the number of objects included in the waiting line formed between the first position and a second position based on a number of objects having passed through the first position and a number of objects having passed through the second position.

3. The information processing apparatus according to claim 1, wherein the first acquisition unit acquires the number of objects in the waiting line by detecting objects in an image obtained by capturing the waiting line and counting a number of the detected objects.

4. The information processing apparatus according to claim 3, wherein the first acquisition unit acquires the number of objects in the waiting line by detecting objects in an area for counting objects set in the image obtained by capturing the waiting line and counting the number of the detected objects.

5. The information processing apparatus according to claim 1, further comprising a first accepting unit configured to accept specification of an area for counting objects through an area specification screen, the area specification screen including an image obtained by capturing the waiting line,
wherein the first acquisition unit acquires a number of objects in the waiting line by detecting objects in the area indicated by the accepted specification in the image and by counting the number of the detected objects.

6. The information processing apparatus according to claim 1, wherein the first acquisition unit acquires the number of objects in the waiting line formed between the first position and a second position by detecting objects in an image obtained by capturing the waiting line at the set time and counting the number of the detected objects, and acquires the number of objects in the waiting line after the set time, based on the number of objects in the waiting line at the set time, a number of objects that have passed through the first position since the set time, and a number of objects that have passed through the second position since the set time.

7. The information processing apparatus according to claim 1, further comprising a third acquisition unit configured to acquire an image of the waiting line, the image being captured by an image acquiring unit;
wherein the first acquisition unit acquires the number of objects in the waiting line by performing counting process for detecting objects in the image and counting the detected objects in image.

8. The information processing apparatus according to claim 1, wherein the first acquisition unit acquires the number of objects in the waiting line by detecting a predetermined portion of an object, to detect the object, in an image obtained by capturing the waiting line and by counting a number of the detected objects.

9. The information processing apparatus according to claim 1, wherein the second acquisition unit detects an object passing through the first position based on a plurality of images obtained by capturing the waiting line at set intervals in the predetermined period.

10. The information processing apparatus according to claim 9, wherein the second acquisition unit detects an object that has passed through the first position based on positions of the object in the plurality of images obtained by capturing the waiting line at the set intervals in the predetermined period and acquires the number of objects passing through the first position based on the number of the detected objects.

11. The information processing apparatus according to claim 10, wherein the second acquisition unit detects an object that has passed through the first position based on a segment line indicating the first position and the positions of the object in the plurality of images obtained by capturing the waiting line at the set intervals in the predetermined period and acquires the number of objects passing through the first position based on the number of the detected objects.

12. The information processing apparatus according to claim 11, wherein the segment line indicating the first position is set such that sizes of areas surrounding the segment line on both sides within the image are greater than or equal to a set size.

13. The information processing apparatus according to claim 11, further comprising a second accepting unit configured to accept specification of the segment line indicating the first position through a segment line specification screen used to specify the segment line, the segment line specification screen including an image obtained by capturing the waiting line,
wherein the second acquisition unit detects an object that has passed through the first position based on the segment line indicating the first position specified by the accepted specification and the positions of the object in the plurality of images obtained by capturing the waiting line at the set intervals in the predetermined period and acquires the number of objects passing through the first position based on the number of the detected objects.

14. The information processing apparatus according to claim 1,
wherein the estimation unit estimates the waiting time in the waiting line formed between the first position and the second position every time an object passes through the first position or the second position, and
wherein in a case where a time period from when an object passes through the first position or the second position to when an object subsequently passes through the first position or the second position is greater than or equal to a threshold, the display control unit causes the display unit to display the estimated waiting time in the waiting line in the next passage of an object through the first position or the second position.

15. The information process apparatus according to claim 1, wherein the estimation unit periodically performs the estimation process at the preset interval and update the waiting time.

16. The information processing apparatus according to claim 1, wherein the display control unit causes the display unit to display a window including the information indicating the number of objects passing through the first position in the predetermined period and information indicating the waiting time estimated in the estimation process.

17. The information processing apparatus according to claim 16, wherein the display control unit causes the display unit to display the window including information indicating the number of objects waiting in the queue, the information indicating the number of objects passing through the first position in the predetermined period, and the information indicating the waiting time estimated in the estimation process.

18. The information processing apparatus according to claim 1, wherein the display control unit causes the display unit to display a window in which the information indicating the estimated waiting time is periodically updated.

19. The information processing apparatus according to claim 7,
wherein the third acquisition unit acquires a first image of a part of the waiting line and a second image of other part of the waiting line, the first image and the second image being captured at a first timing,
wherein the first acquisition unit acquires the number of objects in the waiting line by performing the counting process for the first image and the second image, and
wherein timing at which the counting process is performed for the second image is different from timing at which the counting process is performed for the first image.

20. An information processing method that estimates waiting time in a waiting line, the information processing method comprising:
acquiring a number of objects in the waiting line;
acquiring a number of objects passing through a first position in a predetermined period, the first position corresponding to an exit of the waiting line;
performing estimation process for estimating the waiting time based on the number of objects in the waiting line and the number of objects passing through the first position in the predetermined period;
causing a display unit to display information indicating the estimated waiting time,
wherein if the number of objects passing through the first position in the predetermined period is zero, acquiring a number of objects passing through the first position comprises acquiring a number of objects passing through the first position in an elapsed period that has elapsed since latest passage of an object through the first position,
wherein performing the estimation process comprises performing the estimation process for estimating the waiting time based on the number of objects in the waiting line and the number of objects passing through the first position in the elapsed period.

21. The information processing method according to claim 20, wherein the number of objects in the waiting line formed between the first position and a second position is acquired based on a number of objects having passed through the first position and a number of objects having passed through the second position.

22. The information processing method according to claim 20, wherein the number of objects in the waiting line is acquired by detecting objects in an image obtained by capturing the waiting line and by counting a number of the detected objects.

23. The information processing method according to claim 20, wherein the estimation process is performed periodically at the preset interval and the waiting time is updated.

24. A non-transitory computer-readable storage medium storing a program for causing a computer to execute a method that estimates waiting time in a waiting line, the method comprising:
acquiring a number of objects in the waiting line;
acquiring a number of objects passing through a first position in a predetermined period, the first position corresponding to an exit of the waiting line;
performing estimation process for estimating the waiting time based on the number of objects in the waiting line and the number of objects passing through the first position in the predetermined period;
causing a display unit to display information indicating the estimated waiting time, wherein if the number of objects passing through the first position in the predetermined period is zero, acquiring a number of objects passing through the first position comprises acquiring a number of objects passing through the first position in an elapsed period that has elapsed since latest passage of an object through the first position, wherein performing the estimation process comprises performing the estimation process for estimating the waiting time based on the number of objects in the waiting line and the number of objects passing through the first position in the elapsed period.

* * * * *